United States Patent
Yau et al.

(10) Patent No.: US 11,165,351 B1
(45) Date of Patent: Nov. 2, 2021

(54) CONVERSION APPARATUS WITH OSCILLATION REDUCTION CONTROL AND METHOD OF OPERATING THE SAME

(71) Applicant: ASIAN POWER DEVICES INC., Taoyuan (TW)

(72) Inventors: Yeu-Torng Yau, Taoyuan (TW); Tsung-Liang Hung, Taoyuan (TW)

(73) Assignee: Asian Power Devices Inc., Taoyuan (TW)

( * ) Notice: Subject to any disclaimer, the term of this patent is extended or adjusted under 35 U.S.C. 154(b) by 0 days.

(21) Appl. No.: 17/016,535

(22) Filed: Sep. 10, 2020

(30) Foreign Application Priority Data

Jun. 3, 2020 (TW) .................... 109118589

(51) Int. Cl.
| | | |
|---|---|---|
| *H02M 3/335* | (2006.01) | |
| *H02M 1/15* | (2006.01) | |
| *H02M 1/34* | (2007.01) | |
| *H02M 1/32* | (2007.01) | |
| *H02M 1/00* | (2006.01) | |

(52) U.S. Cl.
CPC ......... *H02M 3/33507* (2013.01); *H02M 1/15* (2013.01); *H02M 1/32* (2013.01); *H02M 1/34* (2013.01); *H02M 3/33592* (2013.01); *H02M 1/0032* (2021.05); *H02M 1/344* (2021.05)

(58) Field of Classification Search
CPC ...... H02M 3/33507; H02M 1/32; H02M 1/34; H02M 1/15; H02M 3/33592; H02M 1/0032; H02M 1/344
See application file for complete search history.

(56) References Cited

U.S. PATENT DOCUMENTS

| | | | | |
|---|---|---|---|---|
| 5,126,931 A | * | 6/1992 | Jitaru | H02M 3/33569 363/131 |
| 5,430,633 A | * | 7/1995 | Smith | H02M 3/33569 363/20 |
| 5,883,795 A | * | 3/1999 | Farrington | H02M 3/33538 363/21.04 |
| 6,115,271 A | * | 9/2000 | Mo | H02M 1/34 363/56.11 |
| 6,314,002 B1 | * | 11/2001 | Qian | H02M 3/33538 363/21.04 |
| 6,421,255 B1 | * | 7/2002 | Frebel | H02M 3/33538 363/20 |
| 6,473,318 B1 | * | 10/2002 | Qian | H02M 1/34 363/21.16 |
| 9,362,831 B2 | * | 6/2016 | Skinner | H02M 3/156 |
| 9,667,132 B2 | * | 5/2017 | Ghosh | H02M 3/33507 |

(Continued)

OTHER PUBLICATIONS

Taiwan office action dated Dec. 9, 2020 of Taiwan patent application No. 109118589, 6 pages.

*Primary Examiner* — Yusef A Ahmed
(74) *Attorney, Agent, or Firm* — Muncy, Geissler, Olds & Lowe, P.C.

(57) ABSTRACT

A conversion apparatus with oscillation reduction control includes a conversion circuit and an oscillation reduction control circuit. The conversion circuit includes a transformer, a rectifying circuit, and a first switch. The oscillation reduction control circuit stores a leakage inductance energy of the transformer when the first switch is turned off, and the oscillation reduction control provides the leakage inductance energy to a primary-side winding of the transformer when the first switch is turned on.

5 Claims, 10 Drawing Sheets

(56) References Cited

U.S. PATENT DOCUMENTS

| | | | | |
|---|---|---|---|---|
| 9,935,556 B1* | 4/2018 | Rana | ............... | H02M 3/33507 |
| 9,966,861 B1* | 5/2018 | Yeh | ............... | H02M 3/33592 |
| 10,164,539 B1* | 12/2018 | Peng | ............... | H02M 3/33507 |
| 10,177,670 B1* | 1/2019 | Lin | ............... | H02M 1/083 |
| 10,651,746 B2* | 5/2020 | Song | ............... | H02M 3/33592 |
| 10,784,789 B1* | 9/2020 | Nasir | ............... | H02M 3/33569 |
| 10,972,014 B2* | 4/2021 | Jitaru | ............... | H02M 3/33592 |
| 2001/0007530 A1* | 7/2001 | Hosotani | ............... | H02M 3/3382 |
| | | | | 363/20 |
| 2007/0159857 A1* | 7/2007 | Lee | ............... | H02M 3/335 |
| | | | | 363/21.12 |
| 2010/0067259 A1* | 3/2010 | Liu | ............... | H02M 3/33569 |
| | | | | 363/21.01 |
| 2014/0233275 A1* | 8/2014 | Yang | ............... | H02M 3/33576 |
| | | | | 363/21.17 |
| 2015/0003121 A1* | 1/2015 | Yang | ............... | H02M 3/33523 |
| | | | | 363/21.17 |
| 2015/0131341 A1* | 5/2015 | Koo | ............... | H02M 3/33569 |
| | | | | 363/21.13 |
| 2017/0264206 A1* | 9/2017 | Rana | ............... | H02M 3/33569 |
| 2017/0288551 A1* | 10/2017 | Hwang | ............... | H01F 27/004 |
| 2018/0062529 A1* | 3/2018 | Song | ............... | H02M 3/33507 |
| 2018/0069480 A1* | 3/2018 | Koo | ............... | H02M 3/33523 |
| 2018/0226895 A1* | 8/2018 | Song | ............... | H02M 1/34 |
| 2018/0287481 A1* | 10/2018 | Liu | ............... | H02M 3/156 |
| 2019/0058387 A1* | 2/2019 | Shimura | ............... | G03G 15/80 |
| 2019/0140550 A1* | 5/2019 | Song | ............... | H02M 3/33592 |
| 2020/0091826 A1* | 3/2020 | Yang | ............... | H02M 3/33523 |
| 2020/0091827 A1* | 3/2020 | Chen | ............... | H02M 3/33569 |
| 2020/0395857 A1* | 12/2020 | Hwang | ............... | H02M 1/08 |
| 2021/0058000 A1* | 2/2021 | Ahmed | ............... | H02J 7/00 |
| 2021/0194378 A1* | 6/2021 | Tian | ............... | H02M 3/33592 |

\* cited by examiner

CONVERSION APPARATUS WITH OSCILLATION REDUCTION CONTROL AND METHOD OF OPERATING THE SAME

BACKGROUND

Technical Field

The present disclosure relates to a conversion apparatus with oscillation reduction control and a method of operating the same, and more particular to a conversion apparatus with oscillation reduction control and a method of operating the same for slowing down a rising slope when a switch of the conversion apparatus is turned on and turned off.

Description of Related Art

The statements in this section merely provide background information related to the present disclosure and do not necessarily constitute prior art.

A flyback converter is a converter with a transformer and electrical isolation between input circuits and output circuits. The flyback converter can be regarded as a buck-boost converter with a transformer for replacing an inductor, therefore it has the function of voltage conversion as well as the effect of transformer isolation.

Due to the gap between the transformer cores of the flyback converter, the magnetic flux between the windings cannot be fully coupled, thereby causing magnetic leakage to generate leakage inductance. Therefore, a current of the power switch will also flow through this leakage inductance to accumulate energy. However, the leakage inductance is not coupled with other coils, so the power is not transferred and a surge voltage is generated on the power switch. The surge voltage is applied between the drain and the source of the power switch so that a high voltage instantaneously across the power switch. If the voltage exceeds the withstand voltage of the power switch, it may cause damage to the power switch. Therefore, in order to prevent the power switch from being damaged, a snubber is usually provided to suppress the surge voltage.

RCD snubber circuits are the most common snubber circuits, which are mainly composed of resistors, diodes and capacitors. Moreover, the snubber circuit is the basic and necessary circuit in most flyback converters, and it has advantages of low cost, easy to use, and robustness. Therefore, the RCD snubber circuit has been widely used in industry for a long time.

The main task of the RCD snubber circuit is to clamp the voltage spike on the switch within the allowable operation range, and there is not much adjustment function for the rising slope or falling slope of a voltage between the drain and the source of the power switch. The slope of voltage rise or voltage fall is an important source of electromagnetic interference (EMI) common mode noise. The steeper the rising or falling slope, the more serious the electromagnetic interference. Although the slope of the voltage rise or voltage fall can be adjusted by increasing the gate resistor, this manner will increase the switching loss of the power switch, thereby reducing the conversion efficiency and increasing the device temperature.

Therefore, how to design a conversion apparatus with oscillation reduction control and a method of operating the same for slowing down a slope of voltage rise or voltage fall by storing and releasing leakage inductance energy when the power switch switching is a major issue for the inventor of the present disclosure.

SUMMARY

In order to solve the above-mentioned problems, a conversion apparatus with oscillation reduction control is provided. The conversion apparatus with oscillation reduction control includes a conversion circuit and an oscillation reduction control circuit. The conversion circuit includes a transformer, a rectifying circuit, and a first switch. The transformer has a primary-side winding and a secondary-side winding. A first end of the primary-side winding is coupled to an input power source. The rectifying circuit is coupled to the secondary-side winding. A first end of the first switch is coupled to a second end of the primary-side winding. The oscillation reduction control circuit is coupled to the first end of the primary-side winding, the second end of the primary-side winding, and a second end of the first switch. When the first switch is turned off, the oscillation reduction control circuit stores leakage inductance energy of the transformer; when the first switch is turned on, the oscillation reduction control circuit provides the leakage energy to the primary-side winding.

In one embodiment, the oscillation reduction control circuit includes a first diode, a capacitor, a second diode, and an auxiliary winding. A first end of the first diode is coupled to the first end of the primary-side winding. A first end of the capacitor is coupled to a second end of the first diode, and a second end of the capacitor is coupled to the second end of the primary-side winding. A first end of the second diode is coupled to the first end of the capacitor. The auxiliary winding is coupled to the transformer. A first end of the auxiliary winding is coupled to a second end of the second diode, and a second end of the auxiliary winding is coupled to the second end of the first switch. When the first switch is turned off, the capacitor stores the leakage inductance energy; when the first switch is turned on, the leakage inductance energy is provided to the primary-side winding through a resonance between the auxiliary winding and the capacitor.

In one embodiment, the oscillation reduction control circuit further includes a second switch. A first end of the second switch is coupled to the second end of the capacitor, and a second end of the second switch is coupled to the second end of the primary-side winding. When the conversion circuit operates below a light load, the second switch is turned off so as to disable the oscillation reduction control circuit; when the conversion circuit operates above the light load, the second switch is turned on so as to enable the oscillation reduction control circuit.

In one embodiment, when the first switch is turned on, a capacitor voltage of the capacitor oscillates from a positive polarity to a negative polarity so as to slow down a rising slope of a voltage across the first switch when the first switch is turned off.

In one embodiment, when the first switch is turned off, an energy-charging path of the oscillation reduction control circuit is provided from the capacitor, the first diode, and the primary-side winding; when the first switch is turned on, an energy-releasing path of the oscillation reduction control circuit is provided from the capacitor, the first switch, the auxiliary winding, and the second diode.

In one embodiment, when the first switch is turned on, the auxiliary winding generates a reverse DC bias so that a zero voltage transition occurs to a voltage across the first switch and a current flowing through the first switch when the reverse DC bias makes the first switch be turned off.

In one embodiment, when the first switch is turned on, a first current path is formed through the input power source, the primary-side winding, and the first switch; when the first switch is turned off, a second current path is formed through the primary-side winding, the secondary-side winding, and the rectifying circuit.

In order to solve the above-mentioned problems, a method of operating a conversion apparatus with oscillation reduction control is provided. The method includes steps of: controlling turning on a first switch of a conversion circuit to generate a first current path formed through an input power source, a primary-side winding of a transformer, and the first switch, controlling turning off the first switch to generate a second current path formed through the primary-side winding, a secondary-side winding of the transformer, and a rectifying circuit, storing a leakage inductance energy of the transformer by a capacitor of an oscillation reduction control circuit when the first switch is turned off, and providing the leakage inductance energy to the primary-side winding through a resonance between the capacitor and an auxiliary winding coupled to the transformer when the first switch is turned on.

In one embodiment, when the conversion circuit operates below a light load, a path between the conversion circuit and the capacitor is turned off so as to disable the oscillation reduction control circuit; when the conversion circuit operates above the light load, the path between the conversion circuit and the capacitor is turned on so as to enable the oscillation reduction control circuit.

In one embodiment, when the first switch is turned on, a capacitor voltage of the capacitor oscillates from a positive polarity to a negative polarity so as to slow down a rising slope of a voltage across the first switch when the first switch is turned off.

The main purpose and effect of the present disclosure is to use the oscillation reduction control circuit to store the leakage inductance energy on the transformer when the first switch is turned off so as to prevent to generate a surge voltage since the leakage inductance energy cannot be released. Moreover, when the first switch is turned on, the oscillation reduction control circuit provides the previously stored leakage inductance energy to the transformer to achieve energy recovery and reuse to save power consumption.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
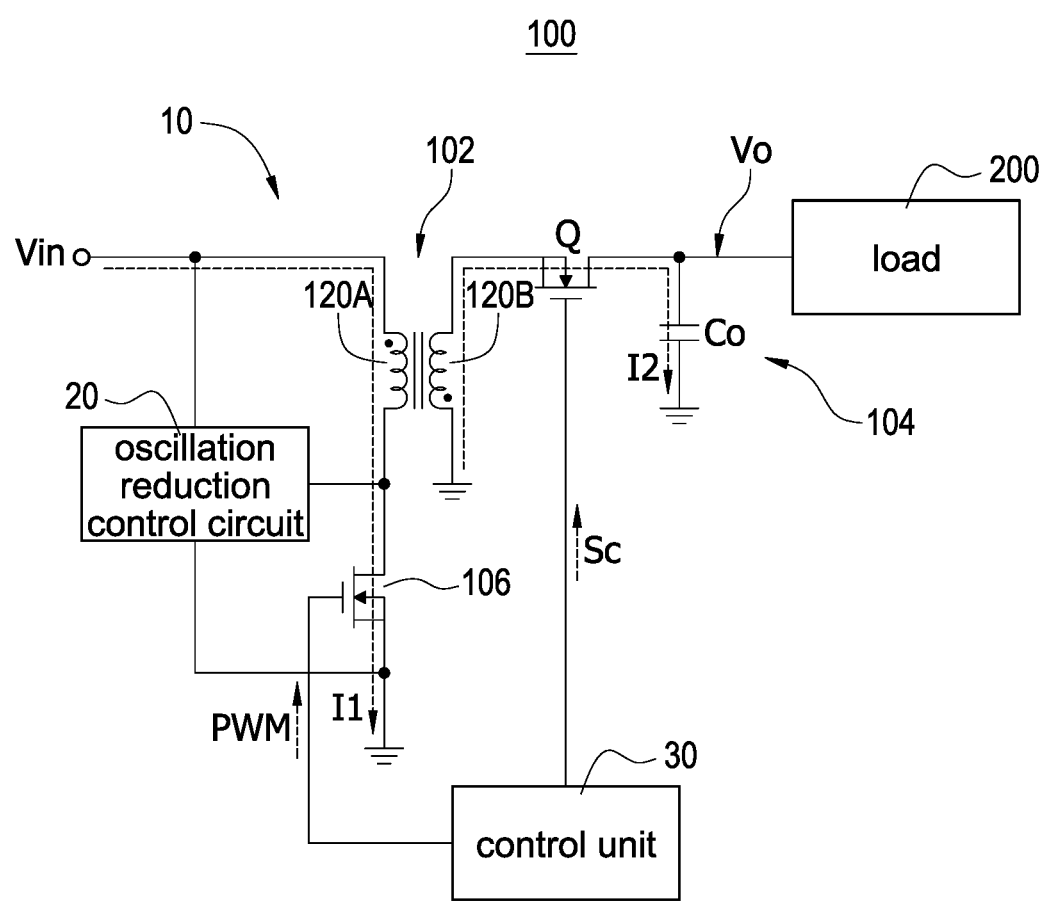
FIG. 1 is a block diagram of a conversion apparatus with oscillation reduction control according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of a conversion apparatus with oscillation reduction control according to the present disclosure. The conversion apparatus 100 includes a conversion circuit 10, an oscillation reduction control circuit 20, and a control unit 30. The conversion circuit 10 receives an input power source Vin and is coupled to a load 200. The oscillation reduction control circuit 20 is coupled to the conversion circuit 10. The control unit 30 is coupled to the conversion circuit 10 and controls the conversion circuit 10 to convert the input power source Vin into an output power source Vo for providing the required power of the load 200. Specifically, the conversion circuit 10 is a flyback converter including a transformer 102, a rectifying circuit 104, and a first switch 106. The transformer 102 has a primary-side winding 102A and a secondary-side winding 102B. A first end of the primary-side winding 102A receives the input power source Vin and a second end of the primary-side winding 102A is coupled to a first end of the first switch 106. A second end of the first switch 106 is coupled to a ground end, and a control end of the first switch 106 is coupled to the control unit 30. The rectifying circuit 104 includes a rectifying switch Q and an output capacitor Co. A first end of the secondary-side winding 102B is coupled to a first end of the rectifying switch Q, and a second end of the secondary-side winding 102B is coupled to the ground end. The output capacitor Co is used to provide a voltage of the output power source Vo and stable the voltage. A first end of the output capacitor Co is coupled to a second end of the rectifying switch Q and a second end of the output capacitor Co is coupled to the ground end.

The control unit 30 controls switching of the first switch 106 through a PWM signal, and further provides a control signal Sc to control switching of the rectifying switch Q so that the conversion circuit 10 converts the input power source Vin into the output power source Vo by switching of the first switch 106 and the rectifying switch Q. When the control unit 30 turns on the first switch 106 and turns off the rectifying switch Q, a first current path I1 is formed through the input power source Vin, the primary-side winding 102A, the first switch 106, and the ground end so that the primary-side winding 102A stores energy. When the control unit 30 turns off the first switch 106 and turns on the rectifying switch Q, a second current path I2 is formed through the primary-side winding 102A, the secondary-side winding 102B, the rectifying switch Q, and the output capacitor Co so that the primary-side winding 102A releases energy tot the output capacitor Co. By switching the first switch 106 and the rectifying switch Q by the control unit 30, the synchronous switching of the conversion circuit 10 can be implemented to increase the overall efficiency of the circuit. The rectifying switch Q can be replaced by a passive diode (not shown). When the passive diode is forward biased to be turned on, the energy of the secondary-side winding 102B is provided to the output capacitor Co through the passive diode. When the passive diode is reverse biased to be turned off, a path between the secondary-side winding 102B and the output capacitor Co is disconnected.

The oscillation reduction control circuit 20 is coupled to the first end and the second end of the primary-side winding 102A and the second end of the first switch 106. When the control unit 30 controls switching of the first switch 106, the oscillation reduction of the voltage across the first switch 106 can be achieved. Since the conversion circuit 10 is the flyback converter, the magnetic flux between the primary-side winding 102A and the secondary-side winding 102B cannot be fully coupled, resulting in magnetic leakage because of a gap formed between cores of the transformer 102. The magnetic leakage will cause the leakage inductance. When the control unit 30 controls switching of the first switch 106, a current flowing through the first switch 106 will also flow through the leakage inductance to accumulate (store) energy. Since the leakage inductance cannot be coupled with other windings, however, the generated power cannot be transferred and a surge voltage is generated. If an excessively high surge voltage is applied to two ends (i.e., the drain and the source) of the first switch 106, the voltage across (the two ends of) the first switch 106 may exceed its withstand voltage value and the first switch 106 may be damaged. Therefore, the main purpose and effect of the present disclosure is that, when the control unit 30 controls turning off the first switch 106, the oscillation reduction control circuit 20 is used to store the energy generated by the leakage inductance (briefly referred to as "leakage inductance energy") of the primary-side winding 102A, thereby preventing to generate the surge voltage since the leakage inductance energy cannot be released. Further, when the control unit 30 controls turning on the first switch 106, the oscillation reduction control circuit 20 provides the previously stored leakage inductance energy to the second end of the primary-side winding 102A to achieve energy recovery and reuse to save power consumption.

Figure 2:
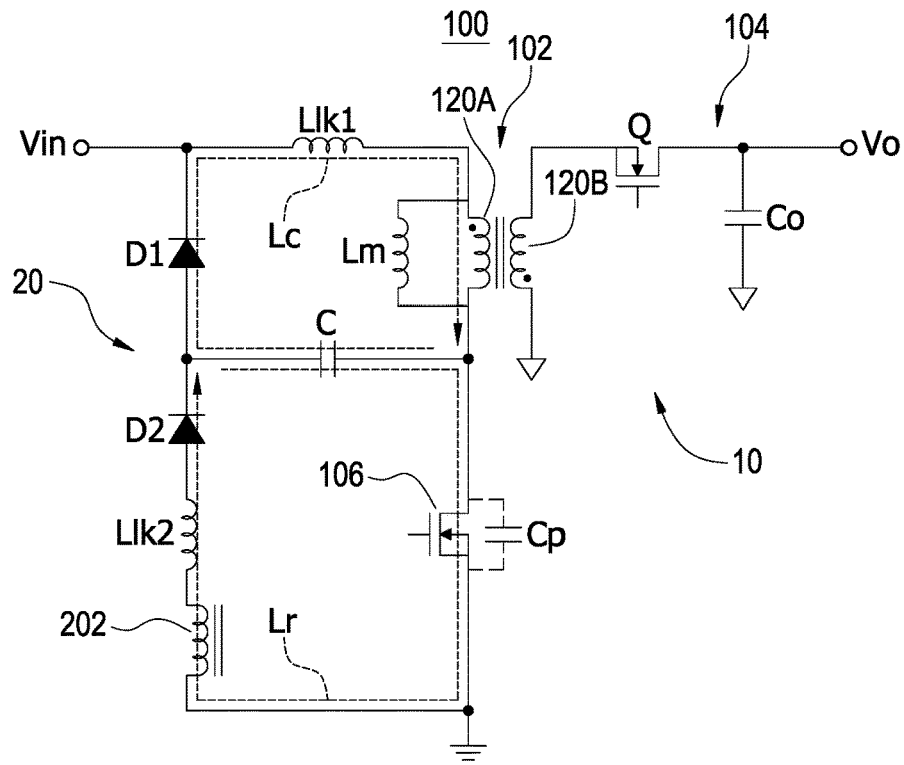
FIG. 2 is an equivalent circuit diagram of a conversion circuit and an oscillation reduction control circuit according to a first embodiment of the present disclosure.

Please refer to FIG. 2, which shows an equivalent circuit diagram of a conversion circuit and an oscillation reduction control circuit according to a first embodiment of the present disclosure, and also refer to FIG. 1. The primary-side winding 102A includes a (equivalent) first leakage inductance Llk1 and a (equivalent) magnetizing inductance Lm. The first leakage inductance Llk1 is coupled in series to the primary-side winding 102A and the magnetizing inductance Lm is coupled in parallel to the primary-side winding 102A. Two ends of the first switch 106 includes a (equivalent) parasitic capacitance Cp indicated by dotted lines. The oscillation reduction control circuit 20 includes a first diode D1, a capacitor C, a second diode D2, and an auxiliary winding 202. The oscillation reduction control circuit 20 only needs the passive components disclosed above to achieve the effect of the oscillation reduction control without additional active control, such as but not limited to switching switches). Therefore, the conversion apparatus 100 can be easily controlled (i.e., only the first switch 106 needs to be controlled), and not easy to cause operation errors. Specifically, a first end of the first diode D1 is coupled to the first end of the primary-side winding 102A, a second end of the first diode D1 is coupled to a first end of the capacitor, and a second end of the capacitor C is coupled to the second end of the primary-side winding 102A. A first end of the second diode D2 is coupled to the first end of the capacitor C, a second end of the second diode D2 is coupled to a first end of the auxiliary winding 202, and a second end of the auxiliary winding 202 is coupled to the second end of the first switch 106. The auxiliary winding 202 is coupled to the transformer 102 and includes a (equivalent) second leakage inductance Llk2, and the second leakage inductance Llk2 is coupled in series to the auxiliary winding 202.

When the control unit 30 controls turning off the first switch 106, an energy-charging path Lc, i.e., a current path of the oscillation reduction control circuit 20 is provided from the second end of the primary-side winding 102A to the capacitor C so that the capacitor C can store the leakage inductance energy of the primary-side winding 102A. Afterward, the current flows back to the primary-side winding 102A through the first diode D1 to form a main current path of releasing energy from the primary-side winding 102A to the capacitor C. When the control unit 30 controls turning on the first switch 106, the leakage inductance energy stored in the capacitor C is provided to the second end of the primary-side winding 102A through a resonance between the auxiliary winding 202 and the capacitor C. Therefore, an energy-releasing path Lr is provided from the capacitor C, the first switch 106, the auxiliary winding 202, the second diode D2 and back to the capacitor C, to form the main current path of releasing the leakage inductance energy.

Figure 3A:
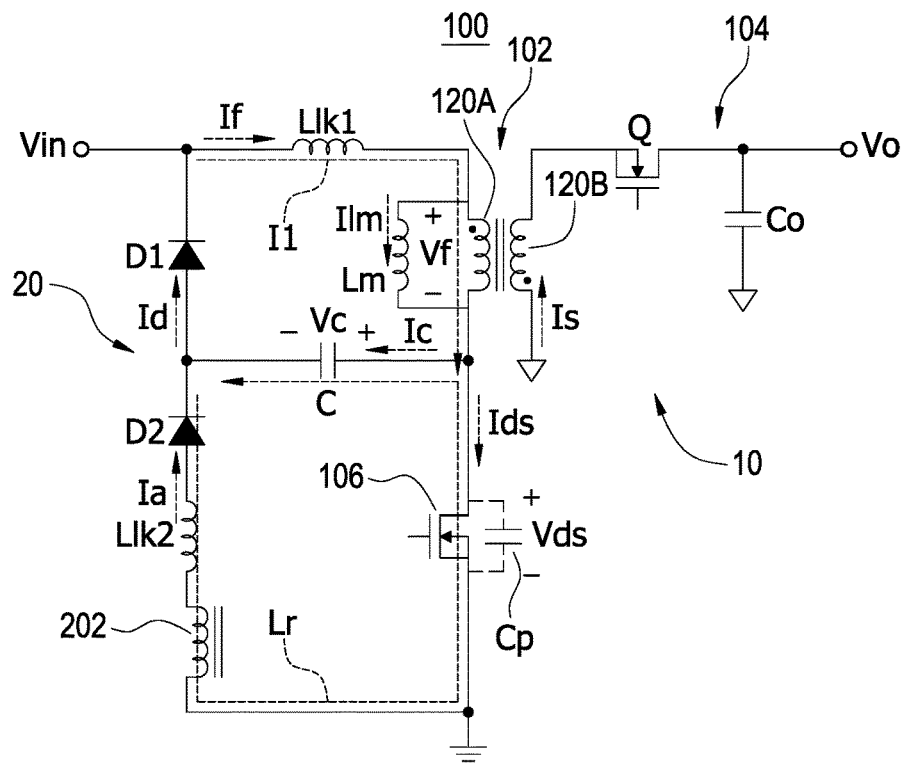
FIG. 3A is a current path diagram of the conversion apparatus with oscillation reduction control operating at a first time sequence according to the present disclosure.
Figure 3B:
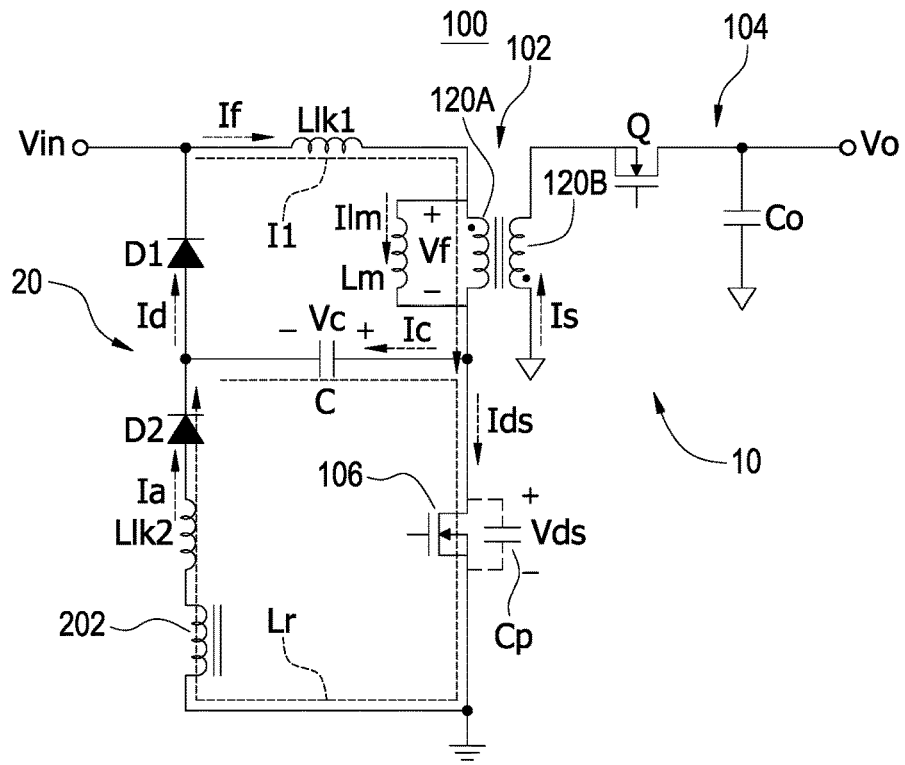
FIG. 3B is a current path diagram of the conversion apparatus with oscillation reduction control operating at a second time sequence according to the present disclosure.
Figure 3C:
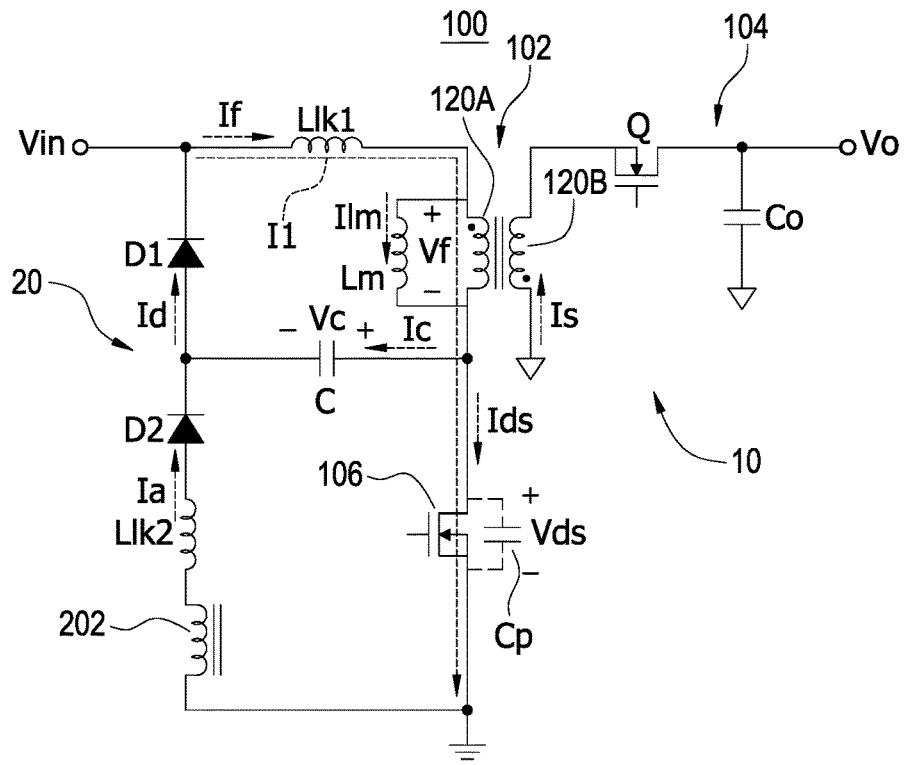
FIG. 3C is a current path diagram of the conversion apparatus with oscillation reduction control operating at a third time sequence according to the present disclosure.
Figure 3D:
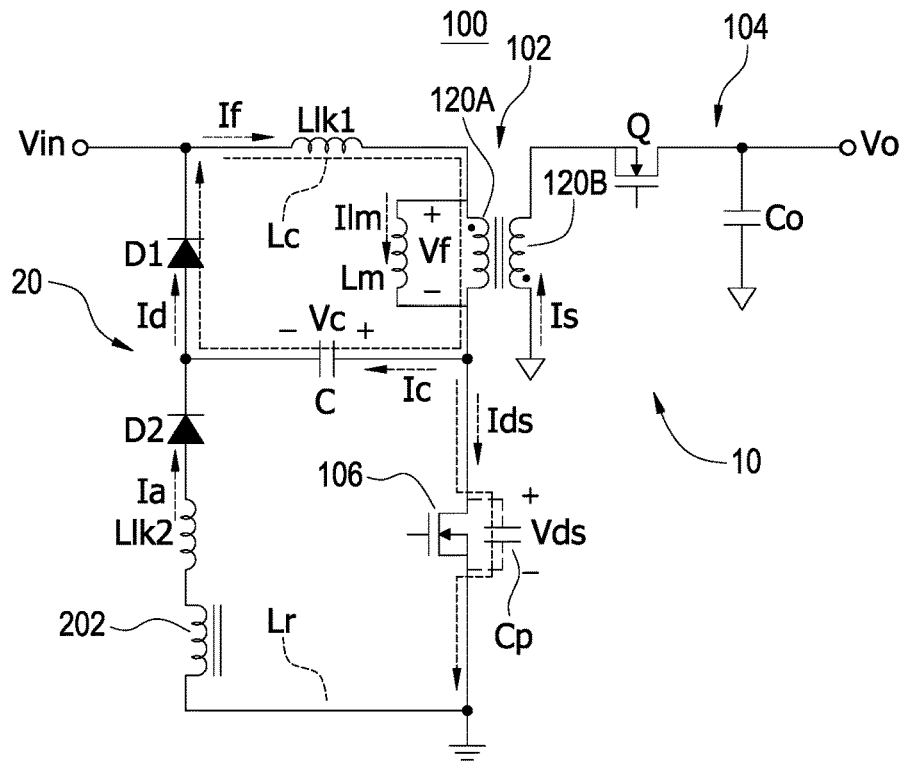
FIG. 3D is a current path diagram of the conversion apparatus with oscillation reduction control operating at a fourth time sequence according to the present disclosure.
Figure 3E:
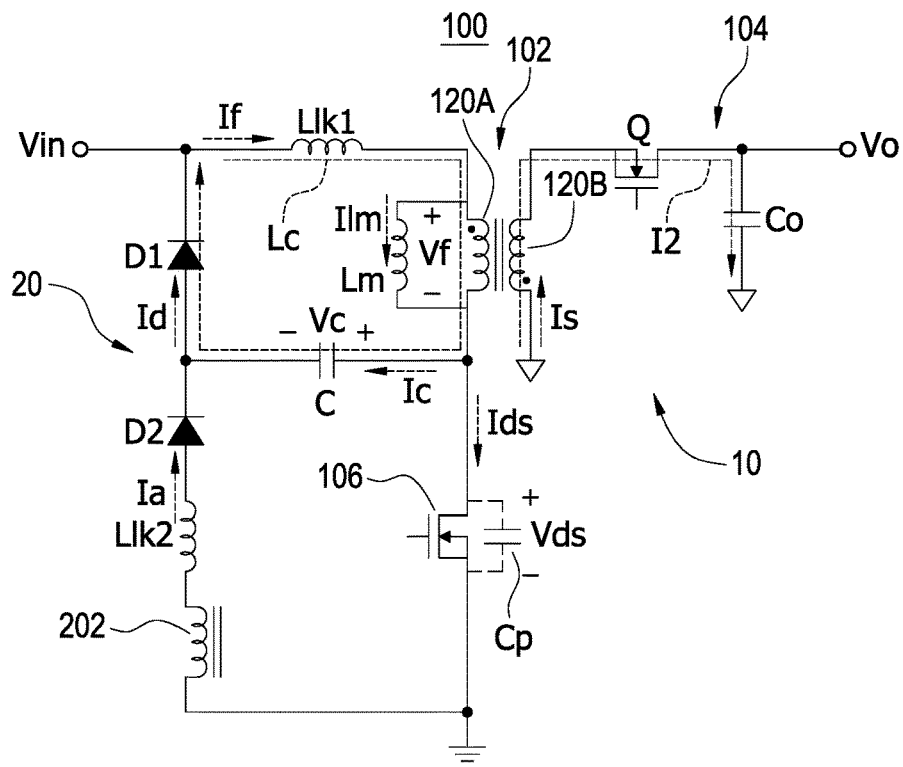
FIG. 3E is a current path diagram of the conversion apparatus with oscillation reduction control operating at a fifth time sequence according to the present disclosure.
Figure 3F:
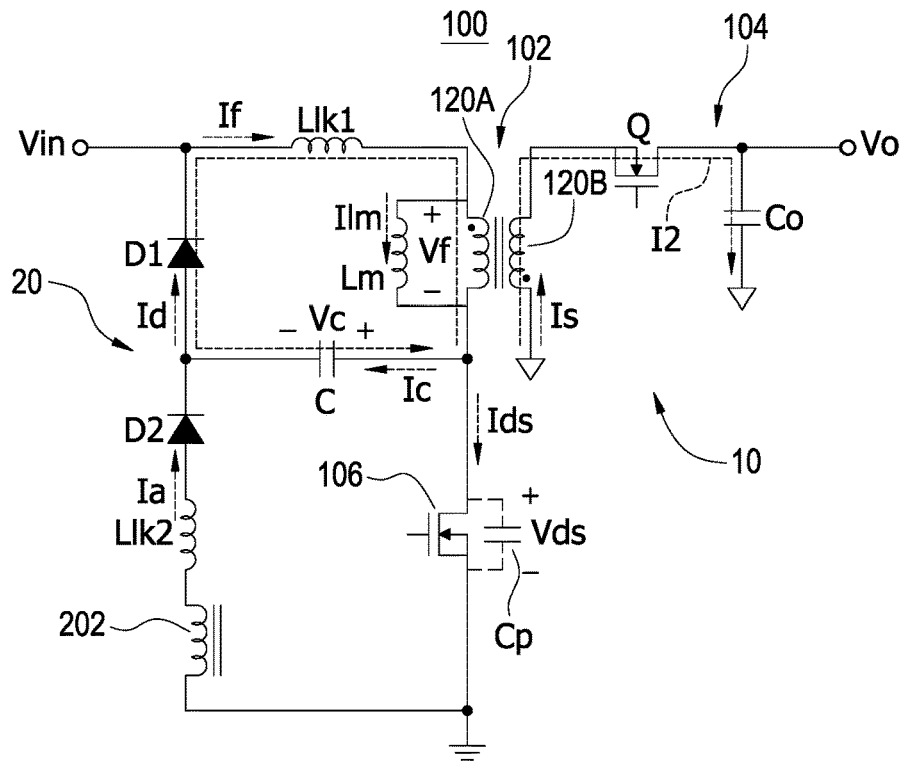
FIG. 3F is a current path diagram of the conversion apparatus with oscillation reduction control operating at a sixth time sequence according to the present disclosure.
Figure 3G:
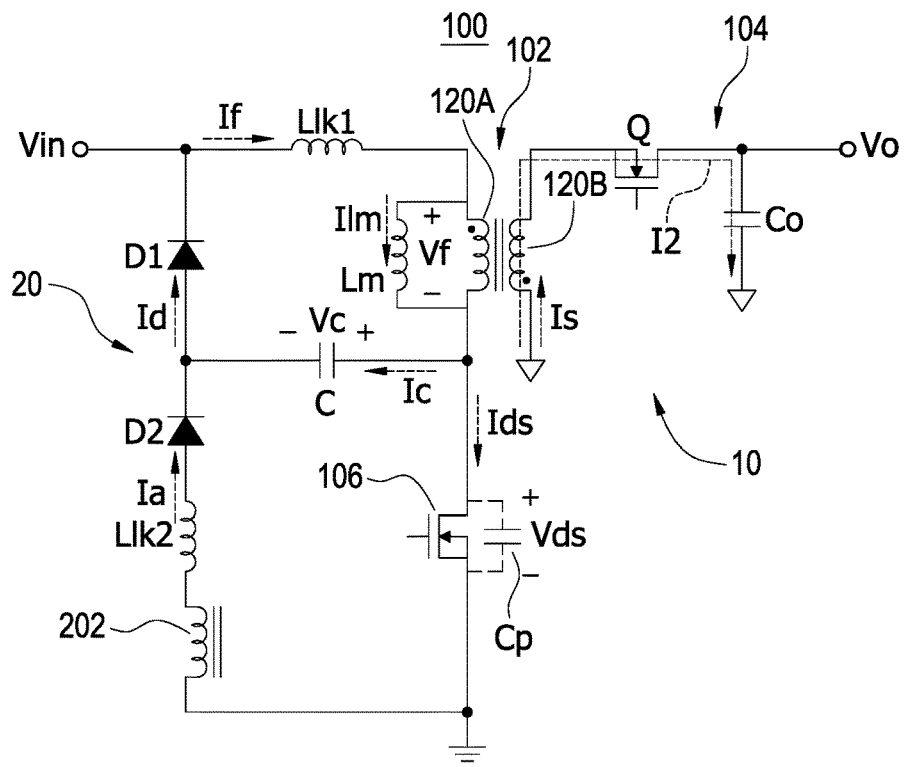
FIG. 3G is a current path diagram of the conversion apparatus with oscillation reduction control operating at a seventh time sequence according to the present disclosure.
Figure 4:
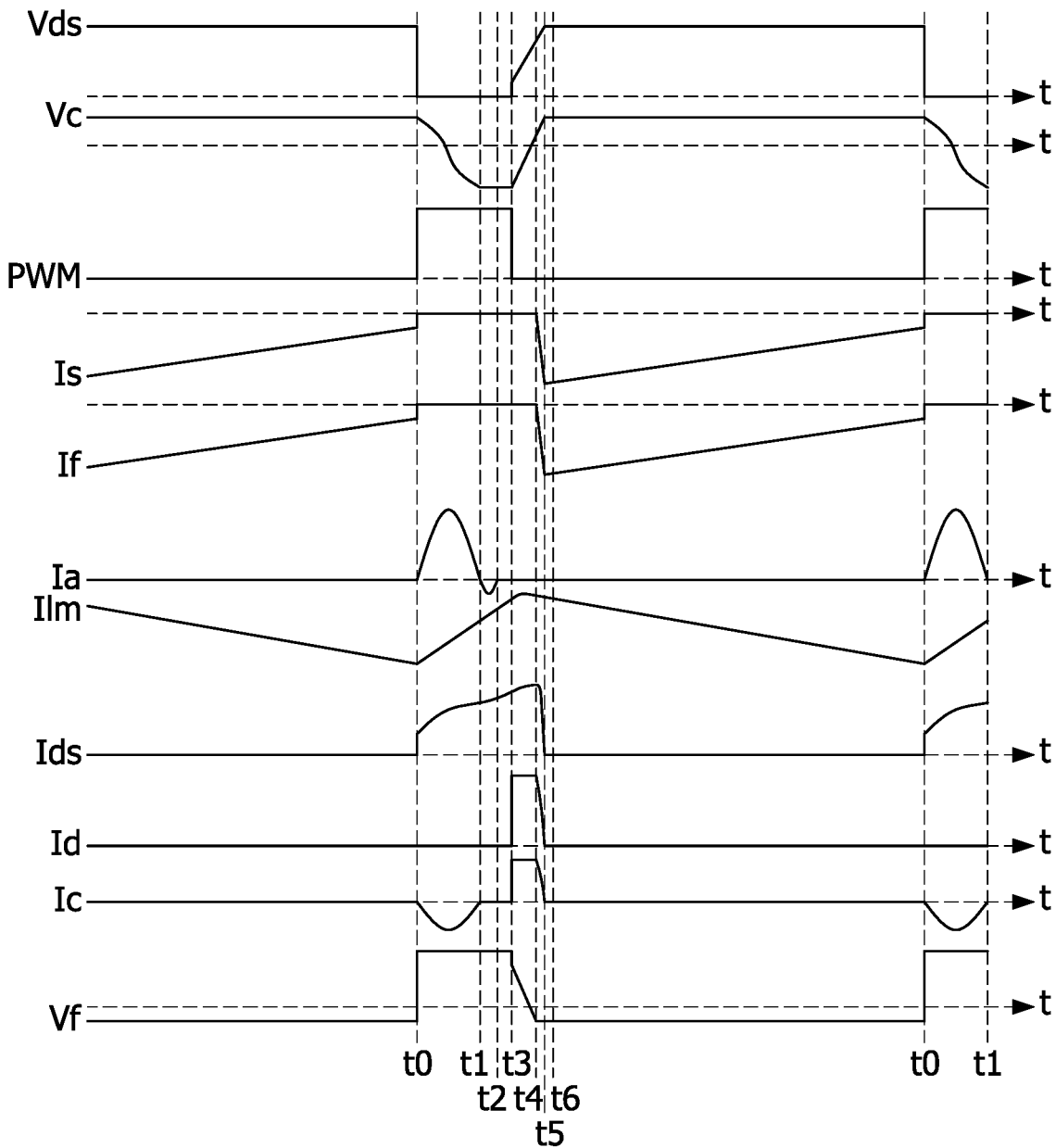
FIG. 4 is a waveform of the conversion apparatus with oscillation reduction control according to the present disclosure.

Please refer to FIG. 3A to FIG. FIG. 3G, which shows current path diagrams of the conversion apparatus with oscillation reduction control operating at a first time sequence to a seventh time sequence according to the present disclosure, respectively, and refer to FIG. 4, which shows a waveform of the conversion apparatus with oscillation reduction control according to the present disclosure, and also refer to FIG. 1 and FIG. 2. FIG. 3A to FIG. 3C show the current path diagrams when the first switch 106 is turned on, and the time point t0 to the time point t3 shown in FIG. 4 are corresponding to FIG. 3A to FIG. 3C; FIG. 3D to FIG. 3G show the current path diagrams when the first switch 106 is turned off, and the time point t3 to the time point t6 shown in FIG. 4 are corresponding to FIG. 3D to FIG. 3G.

As shown in FIG. 4, If represents a current flowing through the first leakage inductance Llk1, Ilm represents a current flowing through the magnetizing inductance Lm, Vf represents a voltage across the primary-side winding 102A, Ids represents a current flowing through the first switch 106, Vds represents a voltage across the first switch 106, PWM represents the PWM signal provided by the control unit 30, Is represents a current represents a current flowing through the secondary-side winding 102B and the rectifying switch Q, Vc represents a voltage across the capacitor C, Ic represents a current flowing through the capacitor C, Ia represents a current flowing through the auxiliary winding 202, and Id represents a current flowing through the first diode D1.

As shown in FIG. 3A, corresponding to the time point t0 to the time point t1 shown in FIG. 4, a current path of the oscillation reduction control circuit 20 is an energy-releasing path Lr. The PWM signal PWM with high level is used to control turning on the first switch 106 (at the time point t0). Since the magnetizing inductance Lm has an initial current, the current Ids flowing through the first switch 106 rapidly rises. Also, the input power source Vin continuously magnetizes the magnetizing inductance Lm to make the magnetizing current Ilm continue to rise. On the other hand, the capacitor voltage Vc on the capacitor C resonates with the second leakage inductance Llk2 to start releasing energy to the second end of the primary-side winding 102A. At this condition, the second diode D2 is forward-bias turned on, and the capacitor voltage Vc will reach the lowest value for a half resonant period (at the time point t1). Also, the first diode D1 is reverse-bias turned off, and the control unit 30 controls turning off the rectifying switch Q so that the diode current Id and the current flowing through the rectifying switch Q are zero.

As shown in FIG. 3B, corresponding to the time point t1 to the time point t2 shown in FIG. 4, the first switch 106 still turned on at the time point t1. At this condition, the input power source Vin continuously magnetizes the magnetizing inductance Lm so that the magnetizing current Ilm continuously rises. On the other hand, the capacitor voltage Vc resonates with the second leakage inductance Llk2 for a half resonant period. Since the second diode D2 is not ideal, the capacitor current Ic discharges in the reverse direction so that the reverse recovery charge of the second diode D2 can be discharged and the second diode D2 is completely turned off due to the reverse bias after the resonance, and therefore the direction of the current flowing through the second diode D2 is opposite for a short time. At the time point t2, the second diode D2 is completely turned off. At this condition, since the first diode D1 is still reverse-bias turned off and the control unit 30 still controls turning off the rectifying switch Q, the diode current Id and the current flowing through the rectifying switch Q are still zero.

As shown in FIG. 3C, corresponding to the time point t2 to the time point t3 shown in FIG. 4, a current path is a first current path I1. The first switch 106 is still turned on at the time point t2 and is turned off at the time point t3. At the time point t3, the first switch 106 is instantaneously turned off. The first leakage inductance Llk1 starts to charge the parasitic capacitance Cp of the first switch 106, and the first leakage inductance Llk1 is magnetized so that the primary current If continuously rises and the voltage Vds (across the first switch 106) rapidly rises. From the time point t2 to the time point t3, the first diode D1 has not been turned on, and therefore the diode current Id (flowing through the first diode D1) and the capacitor current Ic (flowing through the capacitor C) are zero. At this condition, the first diode D1 is still reverse-bias turned off, and the control unit 30 still controls turning off the rectifying switch Q so that the diode current Id and the current flowing through the rectifying switch Q are still zero.

As shown in FIG. 3D, corresponding to the time point t3 to the time point t4 shown in FIG. 4, a current path of the oscillation reduction control circuit 20 is the energy-charging path Lc. The first switch 106 keeps being turned off. The first leakage inductance Llk1 still continuously charges the parasitic capacitance Cp of the first switch 106, and the first leakage inductance Llk1 is still magnetized so that the primary current If continuously rises. At the time point t3 to the time point t4, the first leakage inductance Llk1 is demagnetized so that the primary current If starts to fall (reduce/decrease). At this condition, the first diode D1 is turned on due to the forward bias, and the primary current If charges the capacitor C so that the capacitor voltage Vc starts to increase (i.e., the leakage inductance energy starts to be stored in the capacitor C). At this condition, the diode current Id and the capacitor current Ic are positive. Since the capacitance value of the capacitor C is much larger than that of the parasitic capacitance, the voltage Vds (across the first switch 106) slowly rises in this time interval. At this condition, the control unit 30 still controls turning off the rectifying switch Q so that the current flowing through the rectifying switch Q is still zero.

As shown in FIG. 3E, corresponding to the time point t4 to the time point t5 shown in FIG. 4, the first switch 106 is still turned off, and the control unit 30 controls turning on the rectifying switch Q. At this condition, the magnetizing inductance Lm starts to discharge to the secondary-side winding 102B and the output capacitor Co. When the capacitor voltage Vc is equal to N(Vo+Vth), the first leakage inductance Llk1 starts to be demagnetized so that the primary current If gradually decreases. Where, N represents a turn ratio of the transformer 102 and Vth represents a voltage across the rectifying switch Q when the rectifying switch Q is turned on. At this condition, the primary current If still charges the capacitor C.

As shown in FIG. 3F, corresponding to the time point t5 to the time point t6 shown in FIG. 4, the first switch 106 is still turned off, and the control unit 30 still controls turning on the rectifying switch Q. At this condition, the first leakage inductance Llk1 is completely demagnetized. After the first leakage inductance Llk1 is completely demagnetized, the reverse recovery charge and the reverse recovery time exist since the second diode D2 is not ideal. Therefore, the reverse (opposite-directional) diode current Id and capacitor current Ic flow to the capacitor C until the reverse recovery charge of the first diode D1 is discharged and the first diode D1 is completely turned off due to the reverse bias (at the time point t6). Since the capacitor current Ic is a reverse current, the capacitor voltage Vc is slightly discharged and decreased.

As shown in FIG. 3G, corresponding to the time point t6 to the time point t0 shown in FIG. 4, a current path is a second current path I2. The first switch 106 is still turned off, and the control unit 30 still controls turning on the rectifying switch Q. At this condition, the first leakage inductance Llk1, the first diode D1, the capacitor C, and the parasitic capacitance Cp are stable. Only the magnetizing current Ilm continuously discharges to the secondary-side winding 102B and the output capacitor Co by coupling of the primary-side winding 102A and the secondary-side winding 102B. At the time point t0, the first switch 106 is turned on again. The same waveforms between the time point t0 and the time point t6 will be continuously generated.

Also refer to FIG. 4, at the time point t0 to the time point t1, the first switch 106 is turned on. Since the capacitor voltage Vc of the capacitor C oscillates from the positive polarity to the negative polarity, the capacity of storing the leakage inductance energy is provided. Therefore, when the first switch 106 is turned off (at the time point t3 to the time point t4), two current paths (i.e., a path of flowing through to the parasitic capacitance Cp of the first switch 106 and a path of flowing through to the capacitor C) so as to slow down the rising slope of the voltage across the first switch 106. The slope of the voltage Vds is adjustable when the first switch 106 is instantaneously turned off so that the conversion apparatus 100 is less likely to generate voltage surges and cause damage to the first switch 106, thereby improving the problem of electromagnetic interference (EMI) of the conversion apparatus 100.

When the first switch 106 is turned on (at the time point t0 to the time point t3), a reverse DC bias is generated at two ends of the auxiliary winding 202 since the resonance of the capacitor C. When the reverse DC bias makes the first switch 106 be turned off (at the time point t3 to the time point t4), a zero voltage transition occurs to the voltage Vds across the first switch 106 and the current Ids flowing through the first switch 106. At this zero voltage transition condition, when the voltage Vds starts to increase, the current Ids simultaneously starts to decrease so as to transfer power without power consumption.

Figure 5:
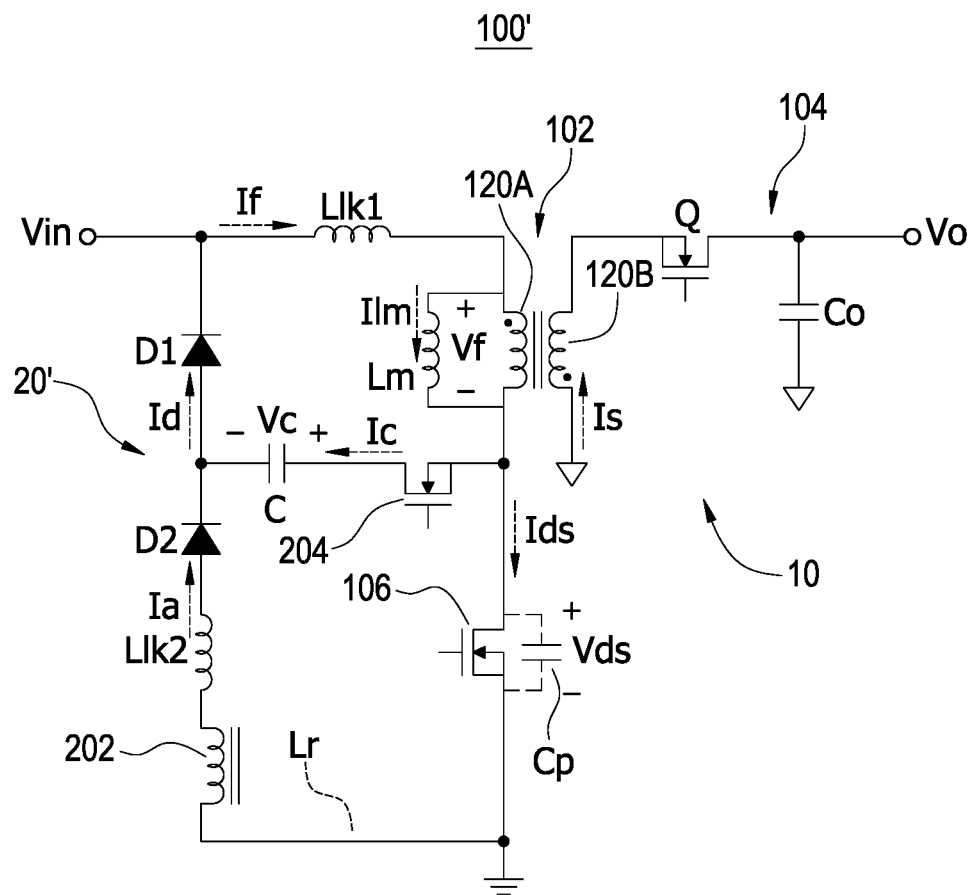
FIG. 5 is an equivalent circuit diagram of the conversion circuit and the oscillation reduction control circuit according to a second embodiment of the present disclosure.

Please refer to FIG. 5, which shows an equivalent circuit diagram of the conversion circuit and the oscillation reduction control circuit according to a second embodiment of the present disclosure, and also refer to FIG. 1 to FIG. 4. The difference between the embodiment shown in FIG. 5 and the embodiment shown in FIG. 2A is that the oscillation reduction control circuit 20' further includes a second switch 204. A first end of the second switch 204 is coupled to the second end of the capacitor C, and a second end of the second switch 204 is coupled to the second end of the primary-side winding 102A. When the control unit 30 realizes that the conversion circuit 100' operates below the light load, the control unit 30 controls turning off the second switch 204 to disable (turn off) the oscillation reduction control circuit 20'. When the control unit 30 realizes that the conversion circuit 100' operates above the light load, the control unit 30 controls turning on the second switch 204 to enable (turn on) the oscillation reduction control circuit 20'.

Specifically, since the conversion circuit 100' has a smaller load current under the light load, the surge voltage is smaller when the first switch 106 is instantaneously turned off. Therefore, the first switch 106 is less likely to be damaged by the surge voltage, and the electromagnetic interference caused by the surge voltage is also smaller. However, the overall circuit efficiency of the conversion circuit 100' will be lower when the conversion circuit 100' operates under the light load. If the oscillation reduction control circuit 20' is still used, the effect of suppressing the surge voltage by the oscillation reduction control circuit 20' is poor, and passive components used in the oscillation reduction control circuit 20' consume additional power without the benefit of effectively improving efficiency. Therefore, when the control unit 30 detects that the conversion circuit 100' operates below the light load, the second switch 204 is turned off by the control unit 30 to turn off (disable) the oscillation reduction control circuit 20' so as to reduce additional power consumption generated by the passive components in the oscillation reduction control circuit 20', thereby avoiding reducing efficiency.

On the other hand, since the conversion circuit 100' has a larger load current over the light load, the surge voltage is larger when the first switch 106 is instantaneously turned off. Therefore, the first switch 106 is easily to be damaged by the surge voltage, and the electromagnetic interference caused by the surge voltage is also larger. In addition, since the overall circuit efficiency of the conversion circuit 100' is better when the conversion circuit 100' has a larger load current over the light load, if the oscillation reduction control circuit 20' is used at this time, the vibration damping control circuit 20' has a better effect of suppressing the surge voltage. Therefore, when the control unit 30 detects that the conversion circuit 100' operates over the light load, the second switch 204 is turned on by the control unit 30 to turn on (enable) the oscillation reduction control circuit 20' so that the oscillation reduction control circuit 20' can provide the function of oscillation reduction control.

Figure 6A:
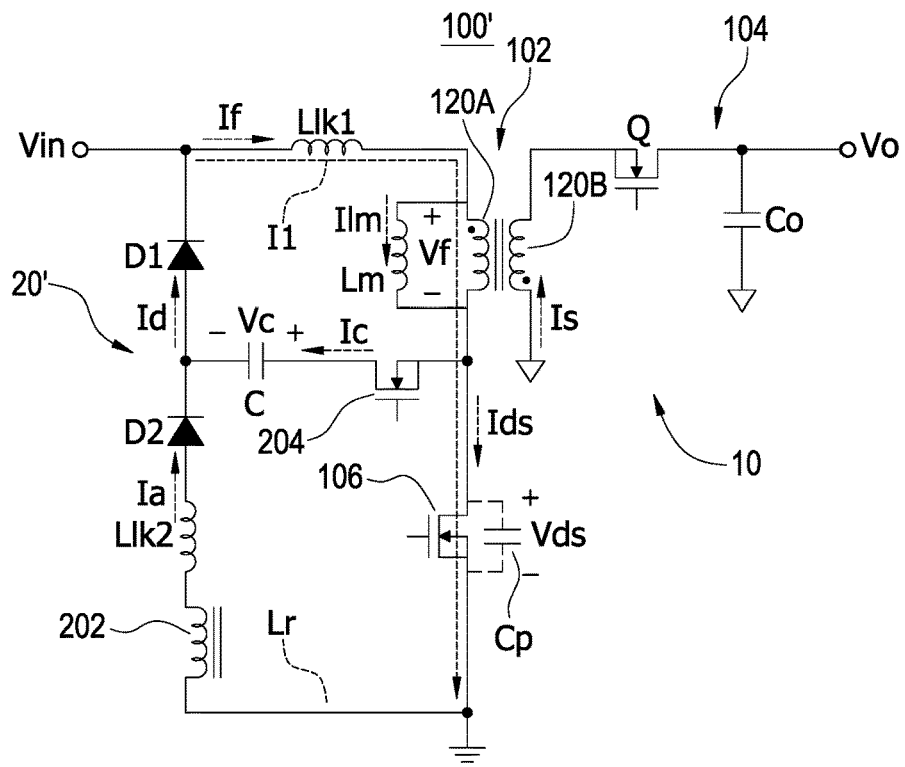
FIG. 6A is a schematic current diagram in a first time sequence below the light load of the conversion apparatus.

Please refer to FIG. 6A, which shows a schematic current diagram in a first time sequence below the light load of the conversion apparatus, and please refer to FIG. 6B, which shows a schematic current diagram in a second time sequence below the light load of the conversion apparatus, and also refer to FIG. 1 to FIG. 5. In FIG. 6A, when the control unit 30 realizes that the conversion circuit 100' operates below the light load, the control unit 30 controls turning off the second switch 204 to disable (turn off) the oscillation reduction control circuit 20'. At this condition, the control unit 30 controls turning on the first switch 106 and controls turning off the rectifying switch Q. The first current path I1 (the input power source Vin to the primary-side winding 102A) is formed through the input power source Vin, the primary-side winding 102A, the first switch 106, and the ground end so that the primary-side winding 102A stores energy. At this condition, the first diode D1 and the second diode D2 are reverse biased to be turned off.

Figure 6B:
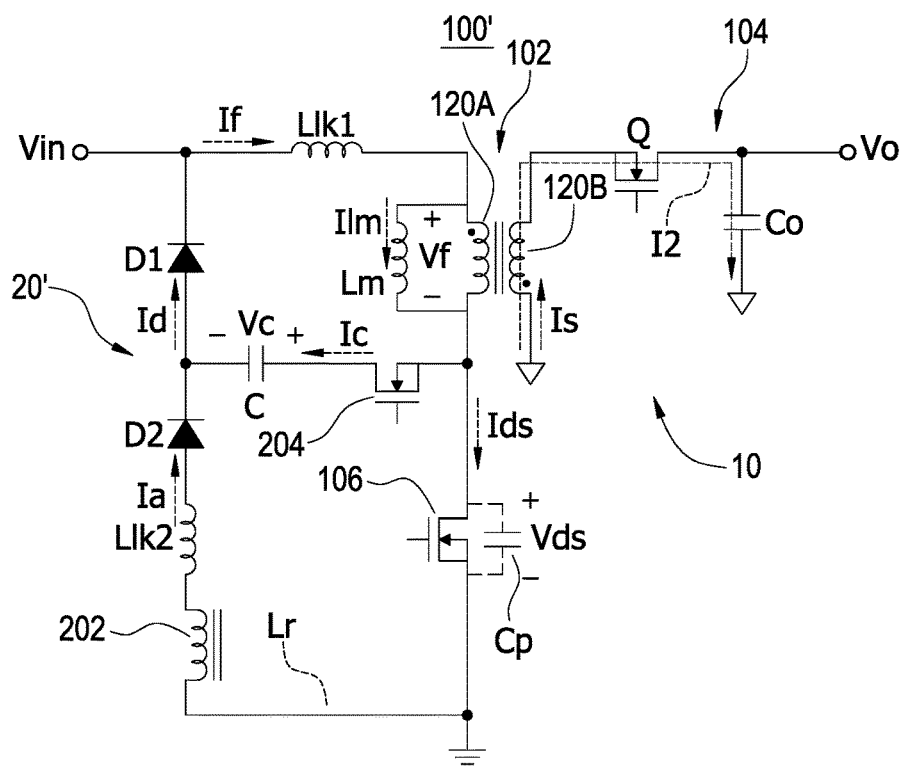
FIG. 6B is a schematic current diagram in a second time sequence below the light load of the conversion apparatus.

In FIG. 6B, since the conversion circuit 100' still operates below the light load, the control unit 30 still controls turning off the second switch 204 to continuously disable the oscillation reduction control circuit 20'. At this condition, the control unit 30 controls turning off the first switch 106 and controls turning on the rectifying switch Q. The second current path I2 (the primary-side winding 102A to the output capacitor Co) is formed through the primary-side winding 102A, the secondary-side winding 102B, the rectifying switch Q, and the output capacitor Co so that the primary-side winding 102A releases energy to the output capacitor Co.

Figure 7A:
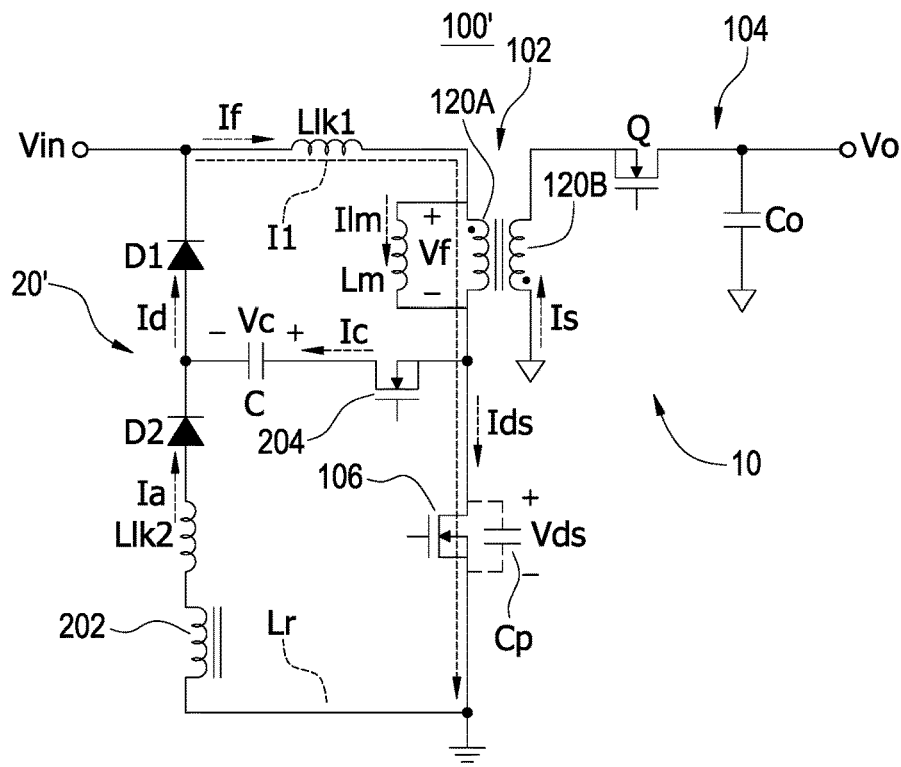
FIG. 7A is a schematic current diagram in the first time sequence above the light load of the conversion apparatus.
Figure 7B:
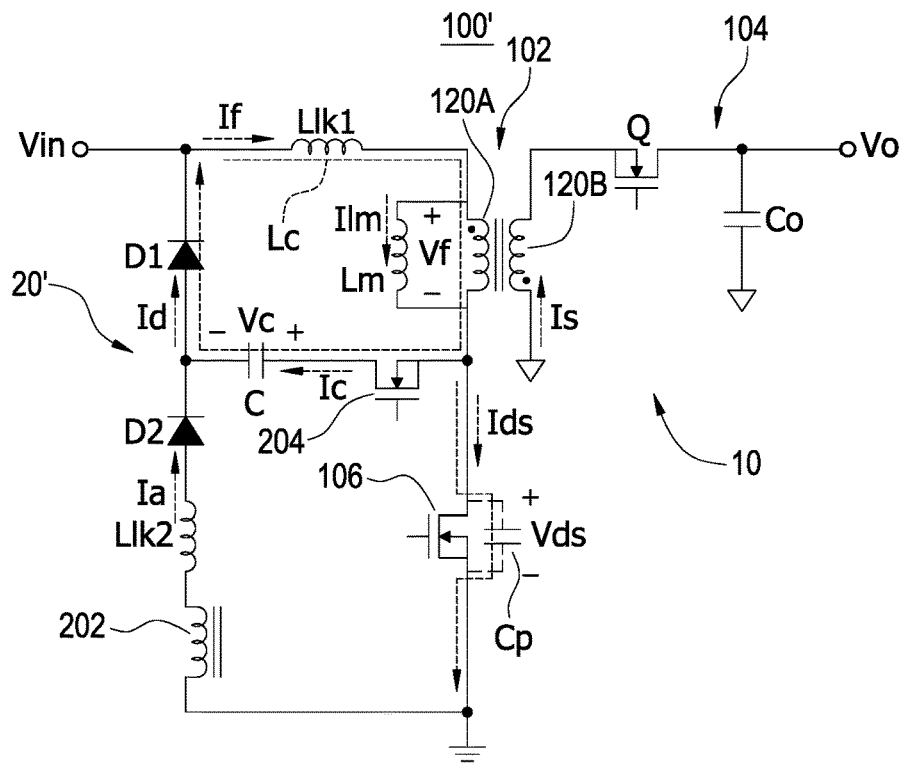
FIG. 7B is a schematic current diagram in the second time sequence above the light load of the conversion apparatus.
Figure 7C:
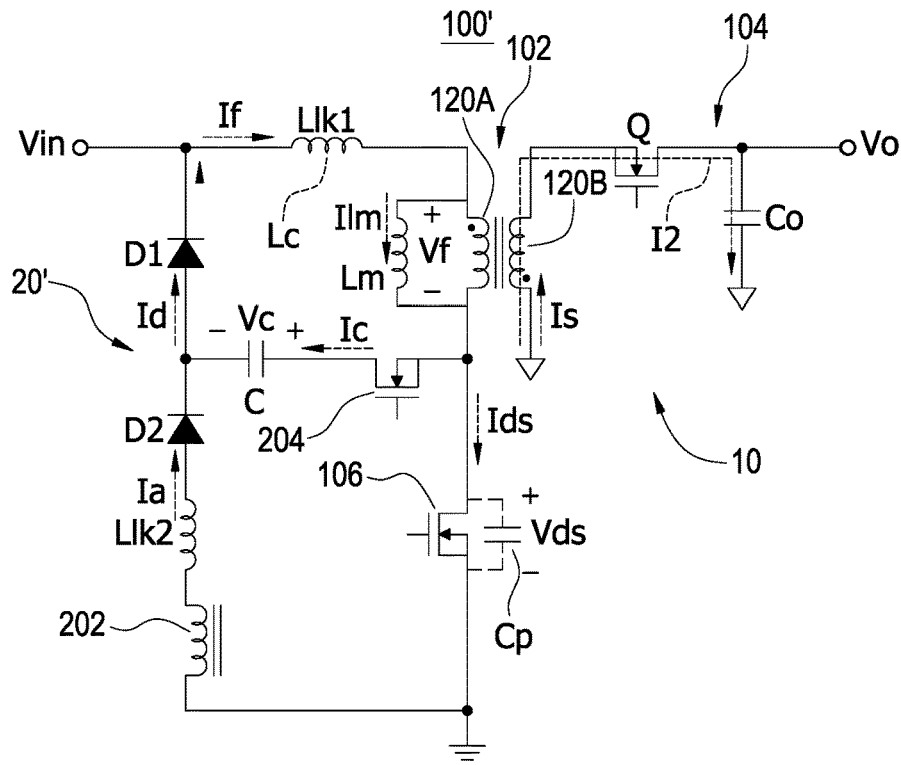
FIG. 7C is a schematic current diagram in a third time sequence above the light load of the conversion apparatus.
Figure 7D:
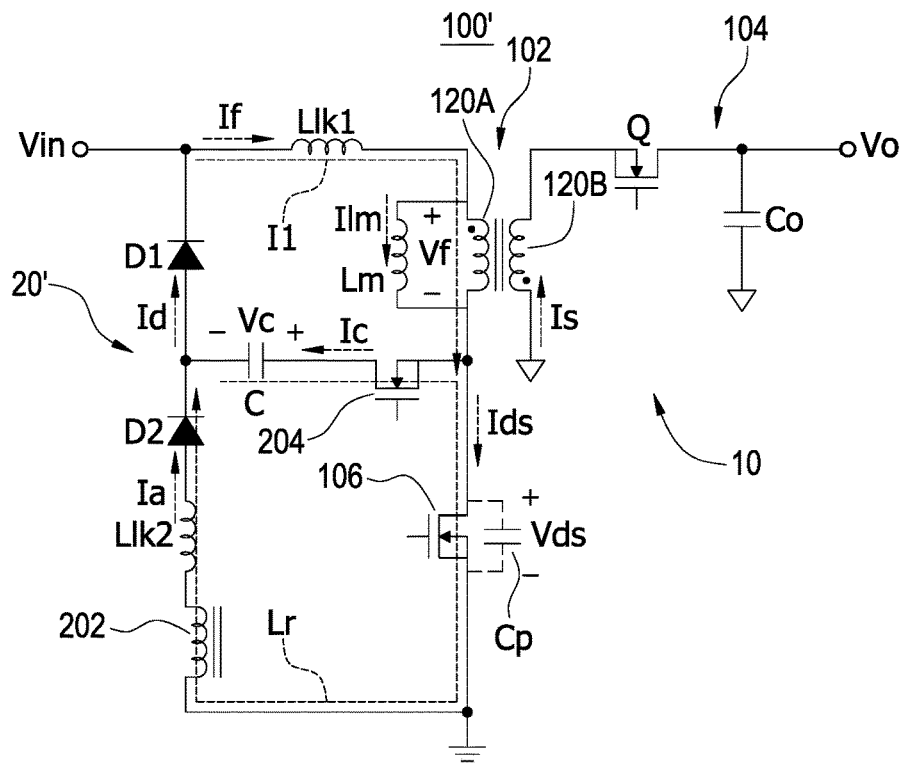
FIG. 7D is a schematic current diagram in a fourth time sequence above the light load of the conversion apparatus.

Please refer to FIG. 7A, which shows a schematic current diagram in the first time sequence above the light load of the conversion apparatus, please refer to FIG. 7B, which shows a schematic current diagram in the second time sequence above the light load of the conversion apparatus, please refer to FIG. 7C, which shows a schematic current diagram in a third time sequence above the light load of the conversion apparatus, please refer to FIG. 7D, which shows a schematic current diagram in a fourth time sequence above the light load of the conversion apparatus, and also refer to FIG. 1 to FIG. 6B. In FIG. 7A, the current path is corresponding to the current path shown in FIG. 3C. When the control unit 30 realizes that the conversion circuit 100' operates above the light load, the control unit 30 controls turning on the second switch 204 to enable (turn on) the oscillation reduction control circuit 20'. At this condition, the control unit 30 controls turning on the first switch 106 and controls turning off the rectifying switch Q. The first current path I1 (the input power source Vin to the primary-side winding 102A) is formed through the input power source Vin, the primary-side winding 102A, the first switch 106, and the ground end so that the primary-side winding 102A stores energy. At this condition, the first diode D1 and the second diode D2 are reverse biased to be turned off. Since the first diode D1 is reverse biased to be turned off, no current flows through the second switch 204 to the capacitor C. At this condition, therefore, the control unit 30 also can control turning off the second switch 204 to avoid forming wrong current paths due to electronic components that are not ideal.

In FIG. 7B, the current path is corresponding to the current path shown in FIG. 3D. Since the conversion circuit 100' still operates above the light load, the control unit 30 still controls turning on the second switch 204 to enable (turn on) the oscillation reduction control circuit 20'. At this condition, the control unit 30 controls turning off the first switch 106 but has not yet controlled turning on the rectifying switch Q. Since the first diode D1 is forward biased to be turned on but the second diode D2 is reverse biased to be turned off, an energy-charging path Lc is provided from the primary-side winding 102A, the second switch 204, the capacitor C, the first diode D1 and back to the primary-side winding 102A. At this time, although a small part of the current charges the parasitic capacitance Cp of the first switch 106 (corresponding to FIG. 3D), it can be ignored because it is too small.

In FIG. 7C, the current path is corresponding to the current path shown in FIG. 3G. Since the conversion circuit 100' still operates above the light load, the control unit 30 still controls turning on the second switch 204 to enable (turn on) the oscillation reduction control circuit 20'. At this condition, the control unit 30 still controls turning off the first switch 106 but has not yet controlled turning on the rectifying switch Q. At this condition, the components coupled to the primary-side winding 102A are stable. Only the primary-side winding 102A continuously discharges to the output capacitor Co by coupling of the primary-side winding 102A and the secondary-side winding 102B. The second current path I2 (the primary-side winding 102A to the output capacitor Co) is formed through the primary-side winding 102A, the secondary-side winding 102B, the rectifying switch Q, and the output capacitor Co so that the primary-side winding 102A releases energy to the output capacitor Co. Since the components coupled to the primary-side winding 102A are stable, no current flows through the second switch 204 to the capacitor C. At this condition, therefore, the control unit 30 also can control turning off the second switch 204 to avoid forming wrong current paths due to electronic components that are not ideal.

In FIG. 7D, the current path is corresponding to the current path shown in FIG. 3A. Since the conversion circuit 100' still operates above the light load, the control unit 30 still controls turning on the second switch 204 to enable (turn on) the oscillation reduction control circuit 20'. At this condition, the control unit 30 still controls turning on the first switch 106 and controls turning off the rectifying switch Q. When the first switch 106 is instantaneously turned on, the first diode D1 is forward biased to be turned on and but the second diode D2 is reverse biased to be turned off. The leakage inductance energy stored in the capacitor C is provided to the primary-side winding 102A through the resonance between the auxiliary winding 202 and the capacitor C. Therefore, an energy-releasing path Lr is provided from the capacitor C, the first switch 106, the auxiliary winding 202, the second diode D2 and back to the capacitor C. In particular, FIG. 7A to FIG. 7D only show the main current paths when the second switch 204 is turned on, and the detailed current paths can refer to FIG. 3A to FIG. 3G, the detail description is omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A conversion apparatus with oscillation reduction control, comprising:
   a conversion circuit, comprising:
      a transformer having a primary-side winding and a secondary-side winding, a first end of the primary-side winding coupled to an input power source,
      a rectifying circuit coupled to the secondary-side winding,
      a first switch, a first end of the first switch coupled to a second end of the primary-side winding, and
   an oscillation reduction control circuit coupled to the first end of the primary-side winding, the second end of the primary-side winding, and a second end of the first switch, the oscillation reduction control circuit comprises:
      a first diode, a first end of the first diode coupled to the first end of the primary-side winding,
      a capacitor, a first end of the capacitor coupled to a second end of the first diode, and a second end of the capacitor coupled to the second end of the primary-side winding,
      a second diode, a first end of the second diode coupled to the first end of the capacitor,
      an auxiliary winding coupled to the transformer, a first end of the auxiliary winding coupled to a second end of the second diode, and a second end of the auxiliary winding coupled to the second end of the first switch, and
      a second switch, a first end of the second switch coupled to the second end of the capacitor, and a second end of the second switch coupled to the second end of the primary-side winding,
   wherein when the first switch is turned off, the oscillation reduction control circuit is configured to store leakage inductance energy of the transformer; when the first switch is turned on, the oscillation reduction control circuit is configured to provide the leakage energy to the primary-side winding,
   wherein when the first switch is turned off, the capacitor is configured to store the leakage inductance energy; when the first switch is turned on, the leakage inductance energy is provided to the primary-side winding through a resonance between the auxiliary winding and the capacitor,
   wherein when the conversion circuit operates below a light load, the second switch is maintained turned off so as to disable the oscillation reduction control circuit; when the conversion circuit operates above the light load, the second switch is maintained turned on so as to enable the oscillation reduction control circuit, and
   wherein when the first switch is turned on, a capacitor voltage of the capacitor oscillates from a positive polarity to a negative polarity so as to slow down a rising slope of a voltage across the first switch when the first switch is turned off.

2. The conversion apparatus with oscillation reduction control in claim 1, wherein when the first switch is turned off, an energy-charging path of the oscillation reduction control circuit is provided from the capacitor, the first diode, and the primary-side winding; when the first switch is turned on, an energy-releasing path of the oscillation reduction control circuit is provided from the capacitor, the first switch, the auxiliary winding, and the second diode.

3. The conversion apparatus with oscillation reduction control in claim 1, wherein when the first switch is turned on, the auxiliary winding generates a reverse DC bias so that a zero voltage transition occurs to a voltage across the first switch and a current flowing through the first switch when the reverse DC bias makes the first switch be turned off.

4. The conversion apparatus with oscillation reduction control in claim 1, wherein when the first switch is turned on, a first current path is formed through the input power source, the primary-side winding, and the first switch; when the first switch is turned off, a second current path is formed through the primary-side winding, the secondary-side winding, and the rectifying circuit.

5. A method of operating a conversion apparatus with oscillation reduction control, comprising steps of:

controlling turning on a first switch of a conversion circuit to generate a first current path formed through an input power source, a primary-side winding of a transformer, and the first switch, controlling turning off the first switch to generate a second current path formed through the primary-side winding, a secondary-side winding of the transformer, and a rectifying circuit, storing a leakage inductance energy of the transformer by a capacitor of an oscillation reduction control circuit when the first switch is turned off, and providing the leakage inductance energy to the primary-side winding through a resonance between the capacitor and an auxiliary winding coupled to the transformer when the first switch is turned on, wherein when the conversion circuit operates below a light load, a path between the conversion circuit and the capacitor is maintained turned off so as to disable the oscillation reduction control circuit; when the conversion circuit operates above the light load, the path between the conversion circuit and the capacitor is maintained turned on so as to enable the oscillation reduction control circuit, and wherein when the first switch is turned on, a capacitor voltage of the capacitor oscillates from a positive polarity to a negative polarity so as to slow down a rising slope of a voltage across the first switch when the first switch is turned off.

* * * * *